US012734405B2

(12) United States Patent
Marley et al.

(10) Patent No.: US 12,734,405 B2
(45) Date of Patent: Sep. 15, 2026

(54) GRAPH BASED METHOD OF NEXT PITCH PREDICTION

(71) Applicant: STATS LLC, Chicago, IL (US)

(72) Inventors: Daniel Edison Marley, Chesterton, IN (US); Matthew Thomas O'Connor, Chicago, IL (US); Alexander Nicholas Ottenwess, Chicago, IL (US); Aiman Sherani, Chicago, IL (US); Matthew Holbrook, Chicago, IL (US)

(73) Assignee: STATS LLC, Chicago, IL (US)

(*) Notice: Subject to any disclaimer, the term of this patent is extended or adjusted under 35 U.S.C. 154(b) by 1418 days.

(21) Appl. No.: 17/226,211

(22) Filed: Apr. 9, 2021

(65) Prior Publication Data

US 2021/0322825 A1 Oct. 21, 2021

Related U.S. Application Data

(60) Provisional application No. 63/012,671, filed on Apr. 20, 2020.

(51) Int. Cl.
*A63B 24/00* (2006.01)
*G06N 3/045* (2023.01)
(Continued)

(52) U.S. Cl.
CPC ...... *A63B 24/0021* (2013.01); *A63B 24/0062* (2013.01); *G06N 3/045* (2023.01);
(Continued)

(58) Field of Classification Search
CPC . A63B 24/0021; G06F 18/22; G06F 18/2163; G06F 18/28; G06F 18/2415; G06F 3/044; G06F 18/213; G06N 3/08
See application file for complete search history.

(56) References Cited

U.S. PATENT DOCUMENTS 6,167,390 A 12/2000 Brady et al.
8,876,638 B2 * 11/2014 Paul ...................... A63B 71/06 273/108.3

(Continued)

FOREIGN PATENT DOCUMENTS

CN 109558966 A 4/2019

OTHER PUBLICATIONS

Wiedemann et al., "A Tracking System for Baseball Game Reconstruction" (Year: 2020).*

(Continued)

*Primary Examiner* — David Yi
*Assistant Examiner* — Andrew A Bracero
(74) *Attorney, Agent, or Firm* — Bookoff McAndrews, PLLC

(57) ABSTRACT

A system and method for predicting next pitch are disclosed herein. A computing system retrieves pitch-by-pitch information for a plurality of events and game context information associated with each pitch in the pitch-by-pitch information. The computing system converts the pitch-by-pitch information and the game context information into a plurality of graph-based representation. A graph neural network learns to generate a pitch type prediction for each pitch based on the plurality of graph-based representations. The computing system generates a trained graph neural network based on the learning. The computing system receives a current graph-based representation of current pitch-by-pitch information for a current pitcher and current game context information. The computing system predicts, via the trained graph neural network, a pitch type for the next pitch to be delivered from the current pitcher.

20 Claims, 6 Drawing Sheets

(51) Int. Cl.
*G06N 3/08* (2023.01)
*A63B 102/18* (2015.01)

(52) U.S. Cl.
CPC ........ *G06N 3/08* (2013.01); *A63B 2024/0034* (2013.01); *A63B 2024/0056* (2013.01); *A63B 2102/18* (2015.10)

(56) References Cited

U.S. PATENT DOCUMENTS

| | | | | |
|---|---|---|---|---|
| 2008/0103997 | A1* | 5/2008 | Fein | G06N 3/02 706/12 |
| 2017/0046614 | A1 | 2/2017 | Golovashkin et al. | |
| 2017/0213132 | A1 | 7/2017 | Hammond et al. | |
| 2017/0213156 | A1 | 7/2017 | Hammond et al. | |
| 2019/0224556 | A1 | 7/2019 | Ruiz et al. | |
| 2020/0034713 | A1* | 1/2020 | Golovashkin | G06N 3/082 |

OTHER PUBLICATIONS

Tan et al., "Neural Network Model of Message Passing in Team Cooperation", Tan et al. (Year: 2020).*
Wang et al., "Pose-Based Two-Stream Relational Networks for Action Recognition in Videos" (Year: 2018).*
PCT International Application No. PCT/US21/26520, International Search Report and Written Opinion of the International Searching Authority, dated Jul. 14, 2021, 11 pages.
Daniel Calzada: "Deepball: Modeling Expectation And Uncertainty In Baseball With Recurrent Neural Networks", Graduate Dissertations and Theses at Illinois, Apr. 25, 2018 (Apr. 25, 2018), XP093154857, Retrieved from the Internet: URL:https://retrosheet.org/Research/Calzada/CALZADA-THESIS-2018.pdf.
Glenn Sidle et al.: "Using multi-class classification methods to predict baseball pitch types", Journal Of Sports Analytics, vol. 4, No. 1, Feb. 27, 2018 (Feb. 27, 2018), pp. 85-93, XP093154862, ISSN: 2215-020X, DOI: 10.3233/JSA-170171Retrieved from the Internet: URL:https://content.iospress.com/download/journal-of-sports-analytics/jsa171?id=journal-of-sports-analytics/jsa171>.
Kaan Koseler et al.: "Machine Learning Applications in Baseball: A Systematic Literature Review", Applied Artificial Intelligence, vol. 31, No. 9-10, Nov. 26, 2017 (Nov. 26, 2017), pp. 745-763, XP093155085, us ISSN: 0883-9514, DOI: 10.1080/08839514.2018.1442991Retrieved from the Internet: URL:https://www.tandfonline.com/doi/pdf/10.1080/08839514.2018.1442991>.
Phoung Hoang: "Supervised learning in baseball pitch prediction and Hepatitis C Diagnosis", NC State University Libraries,Oct. 21, 2015 (Oct. 21, 2015), XP093154854,Retrieved from the Internet: URL:https://repository.lib.ncsu.edu/server/api/core/bitstreams/96d68702-8361-4bf0-96 86-87c9e62d001b/content.
Extended European Search Report for European Application No. 21792485.1, mailed May 22, 2024, 8 pages.

* cited by examiner

600
Memory 615
620
625
ROM
RAM
Storage Device
630
Serv. 1
632
Serv. 2
634
Serv. 3
636
645
Input Device
635
Output Device
640
Communication Interface
605
612
Cache
Processor
610

650
685
User Interface Components
655
Processor
660
690
680
Bridge
Chipset
Communication Interface
665
Output
670
Storage Device
675
RAM

GRAPH BASED METHOD OF NEXT PITCH PREDICTION

CROSS-REFERENCE TO RELATED APPLICATIONS

This application claims priority to U.S. Provisional Application Ser. No. 63/012,671, filed Apr. 20, 2020, which is hereby incorporated by reference in its entirety.

FIELD OF THE DISCLOSURE

The present disclosure generally relates to system and method for predicting the next pitch using a graph neural network.

BACKGROUND

Personalized predictions in sports are often difficult to make. As the demand for sports analytics information increases, there continues to be a demand for improved methods for generating quick and accurate predictions.

SUMMARY

In some embodiments, a method for predicting a next pitch is disclosed herein. A computing system retrieves pitch-by-pitch information for a plurality of events and game context information associated with each pitch in the pitch-by-pitch information. The computing system converts the pitch-by-pitch information and the game context information into a plurality of graph-based representation. A graph neural network learns to generate a pitch type prediction for each pitch based on the plurality of graph-based representations. The computing system generates a trained graph neural network based on the learning. The computing system receives a current graph-based representation of current pitch-by-pitch information for a current pitcher and current game context information. The computing system predicts, via the trained graph neural network, a pitch type for the next pitch to be delivered from the current pitcher.

In some embodiments, a system for predicting a next pitch is disclosed herein. The system includes a processor and a memory. The memory has programming instructions stored thereon, which, when executed by the processor, performs one or more operations. The one or more operations include retrieving pitch-by-pitch information for a plurality of events and game context information associated with each pitch in the pitch-by-pitch information. The one or more operations further include converting the pitch-by-pitch information and the game context information into a plurality of graph-based representation. The one or more operations further include learning, by a graph neural network, to generate a pitch type prediction for each pitch based on the plurality of graph-based representations. The one or more operations further include generating a trained graph neural network based on the learning. The one or more operations further include receiving a current graph-based representation of current pitch-by-pitch information for a current pitcher and current game context information. The one or more operations further include predicting, via the trained graph neural network, a pitch type for the next pitch to be delivered from the current pitcher.

In some embodiments, a non-transitory computer readable medium is disclosed herein. The non-transitory computer readable medium includes one or more sequences of instructions that, when executed by the one or more processors, causes one or more operations. The one or more operations include retrieving pitch-by-pitch information for a plurality of events and game context information associated with each pitch in the pitch-by-pitch information. The one or more operations further include converting the pitch-by-pitch information and the game context information into a plurality of graph-based representation. The one or more operations further include learning, by a graph neural network, to generate a pitch type prediction for each pitch based on the plurality of graph-based representations. The one or more operations further include generating a trained graph neural network based on the learning. The one or more operations further include receiving a current graph-based representation of current pitch-by-pitch information for a current pitcher and current game context information. The one or more operations further include predicting, via the trained graph neural network, a pitch type for the next pitch to be delivered from the current pitcher.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein are generally directed to a system and method for predicting the next play (e.g., pitch) in an event based on the event's context and historical information associated with players involved in the play. Using a specific example, one or more techniques described herein are generally directed to a system and method for predicting the next pitch based on, for example, the current game context (e.g., strikes, balls, inning, score) and pitch points (e.g., expected run value) associated with the batter and/or the pitcher. To generate such predictions, one or more systems described herein may implement a graph neural network configured to receive, as input, a graph-based representation of the previous pitches leading up to the current pitch.

Figure 1:
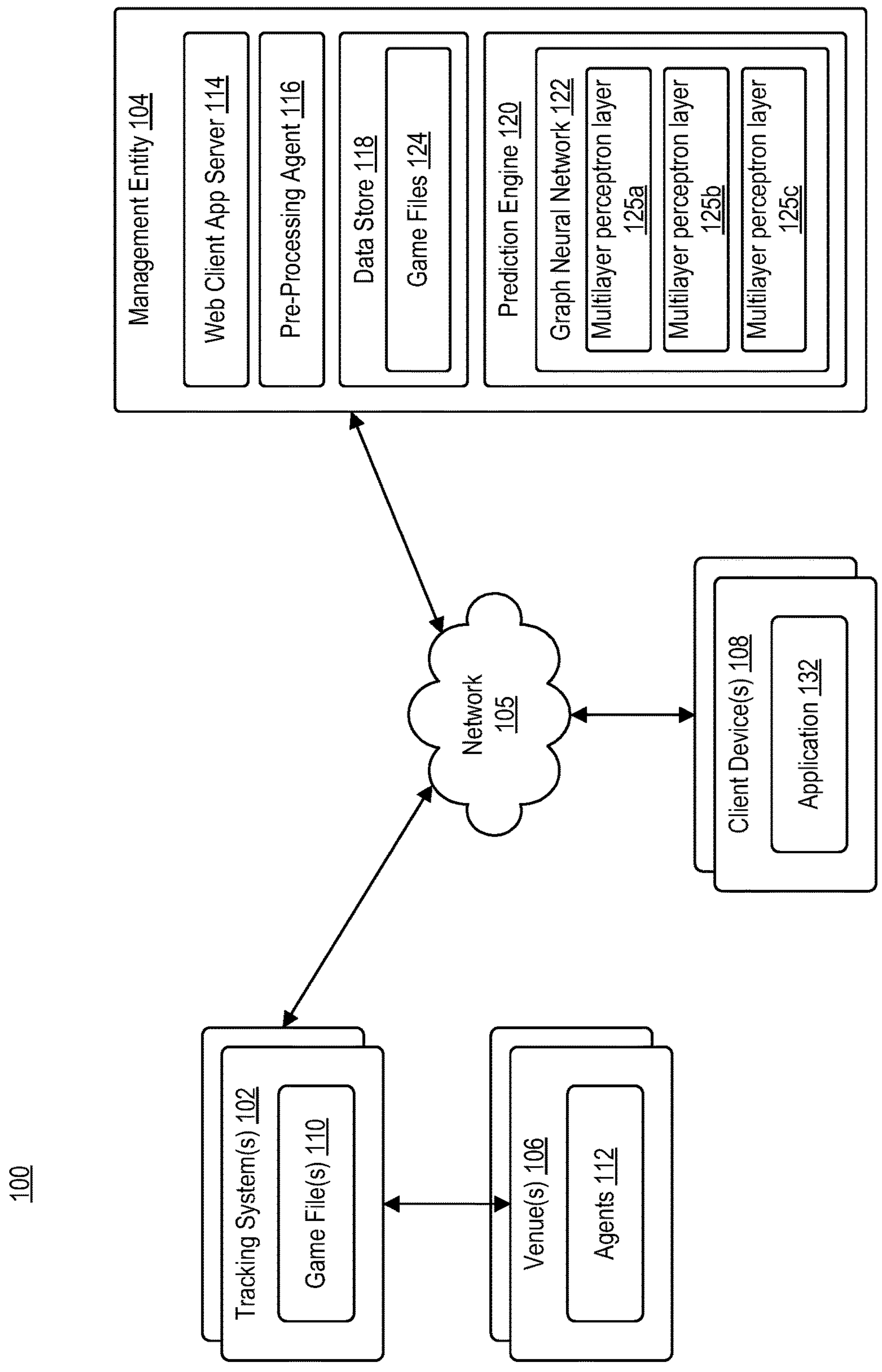
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the playing surface (e.g., high sideline view, free-throw line view, strike zone view, huddle view, face-off view, end zone view, etc.). In some embodiments, tracking system 102 may be used for a broadcast feed of a given match.

Game file 110 may be representative of data associated with a particular match. For example, game file 110 may include information such as the capture motions of all agents, as well as one or more other objects of relevance. In some embodiments, game file 110 may further include play-by-play information (e.g., pitch-by-pitch information). In some embodiments, game file 110 may further include game context information (e.g., current pitch count (e.g., balls and strikes) current inning, current score, runners on base, what happened at the pitch (e.g., hit, foul, out, strike, ball, etc.).

Tracking system 102 may be configured to communicate with organization computing system 104 via network 105. Organization computing system 104 may be configured to manage and analyze the broadcast feed captured by tracking system 102. Organization computing system 104 may include at least a web client application server 114, a pre-processing agent 116, a data store 118, and a prediction engine 120.

Each of pre-processing agent 116 and prediction engine 120 may include one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include at least the play-by-play (e.g., pitch-by-pitch) data for a given match. In some embodiments, each game file 124 may further include video data (e.g., broadcast data) of a given match. For example, the video data may be representative of a plurality of video frames captured by tracking system 102. In another example, the video data may be representative of a plurality of video frames from a broadcast video feed of the respective match.

Pre-processing agent 116 may be configured to process data retrieved from data store 118 and/or tracking system 102. Pre-processing agent 116 may parse the pitch-by-pitch data and generate, for each pitch, a label for each pitch based on the type of pitch. For example, pre-processing agent 116 may be configured to label a pitch with one of the following pitch types: fastball (e.g., 4-seam fastball), change-up, breaking ball (e.g., slider, curve ball, knuckle curve, knuckle ball), and fast movement (e.g., 2-seam fastball, sinker, cutter, split finger).

Pre-processing agent 116 may be further configured to generate a graph-based representation of the pitch-by-pitch data. For example, for each game, pre-processing agent 116 may generate one or more graphs, with each graph corresponding to pitches delivered by a respective pitcher that game. Using a specific example, if pitcher 1 throws 5 pitches, pre-processing agent 116 may generate a first graph corresponding to the 5 pitches thrown by pitcher 1. If pitcher 2 relieves pitcher 1 and throws 10 pitches, pre-processing agent 116 may further generate a second graph corresponding to the 10 pitches thrown by pitcher 2. Each node in the graph may correspond to each pitch thrown by the pitcher. Continuing with the above examples, the graph generated for pitcher 1 would include 5 nodes and the graph generated for pitcher 2 would include 10 nodes. Pre-processing agent 116 may store information associated with the pitch in a respective node that represents that pitch. For example, pre-processing agent 116 may store information such as, pitch type, pitch count (e.g., balls to strikes), inning, runners on base (if any), score, expected run value, and the like on each respective node.

In some embodiments, each graph may be a directed graph, i.e., the edges between nodes may denote the relative order of pitches.

Further, in some embodiments, pre-processing agent 116 may generate one or more global variables. The one or more global variables may include the same type information stored on each node. However, in some embodiments, the one or more global variables do not include the outcome of the pitch (e.g., hit, run, out, strike, ball, etc.) and may only contain information pertaining to the upcoming pitch.

Prediction engine 120 may be configured to predict the next pitch based on at least the pitch-by-pitch data. For example, given data corresponding to the previous pitches delivered by the pitcher (or none of the previous pitches and only other event context), prediction engine 120 may be configured to predict the next pitch to be delivered from the pitcher to the batter.

As shown, prediction engine 120 may include graph neural network 122. Graph neural network 122 may include at least three multilayer perceptron layers 125*a*-125*c*. Multilayer perceptron layer 125*a* may receive, as input, edge information that connects each pitch (e.g., each node) in time. However, because each edge does not initially contain information, multilayer perceptron layer 125*a* may receive, as input, features corresponding to the sending and receiving nodes of each edge. As output, multilayer perceptron layer 125*a* may generate new edge embeddings. Multilayer perceptron layer 125*b* may receive, as input, each of the nodes corresponding to each pitch delivered by a specific pitcher in a game. In some embodiments, multilayer perceptron layer 125*b* may further receive, as input, embedded values of the sending and receiving edges that are obtained from multilayer perceptron layer 125*a*. For example, the embedded values may be aggregated for each node and concatenated with the node features when input to multilayer perceptron layer 125*b*. Multilayer perceptron layer 125*c* may receive, as input, global variable information, which may incorporate the game context for the next pitch. Multilayer perceptron layer 125*c* may further receive, as input, an aggregation of the embedded values of the edges and nodes in the graph as obtained from multilayer perceptron layer 125*a* and 125*b*, respectively. For example, both embedded edge and node values may be aggregated from the entire graph and concatenated with the global features when input to multilayer perceptron layer 125*c*.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
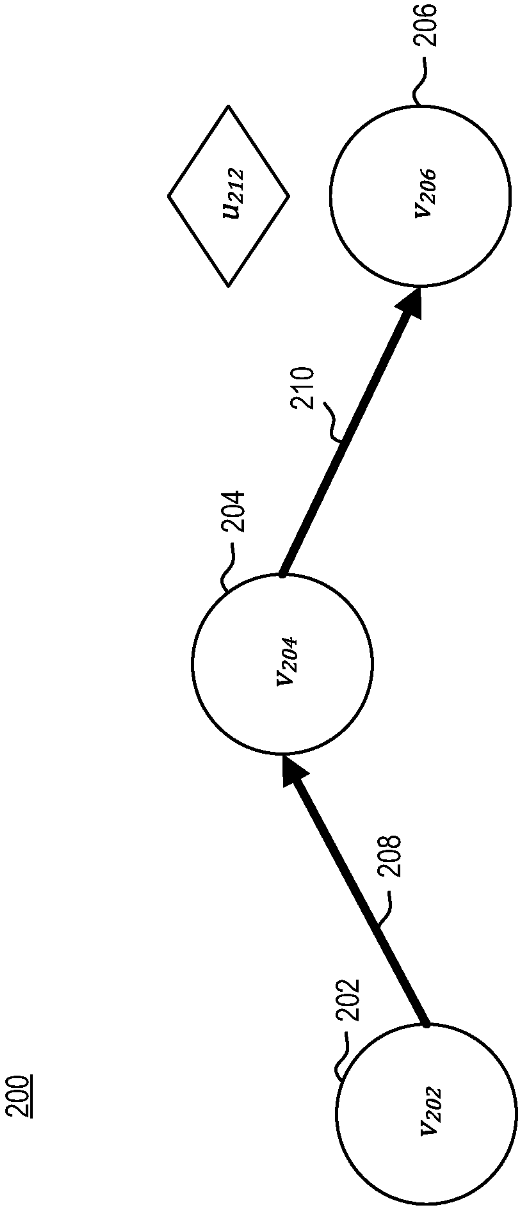
FIG. 2 illustrates a graph-based representation of a pitcher's pitches during an event, according to example embodiments.

FIG. 2 illustrates a graph-based representation of a pitcher's pitches during an event, according to example embodiments. As discussed above, for each game, pre-processing agent 116 may generate a graph-based representation of the pitcher's history in a game. Graph 200 may include node 202, node 204, and node 206. Each node 202-206 may correspond to a respective pitch delivered by the pitcher to the batter in the pitcher's appearance. Edges 208-210 may represent the sequential ordering of pitches delivered by the pitcher. For example, as illustrated, edge 208 may extend between node 202 and node 204; edge 210 may extend between node 204 and node 206. Edge 208 may denote that the pitch corresponding to node 202 preceded the pitch corresponding to node 204. Similarly, edge 210 may denote that the pitch corresponding to node 204 preceded the pitch corresponding to node 206.

Generally, each node 202-206 may include one or more node features $v_i$, where i represents the given node. For example, $v_{202}$ may correspond to node features associated with node 202; $v_{204}$ may correspond to node features associated with node 204; and $v_{206}$ may correspond to node features associated with node 206. Exemplary node features may include, but are not limited to, the game context at each pitch, pitch outcomes, and various performance features associated with the batter and the pitcher. For example, node features may include pitch type, pitch count (e.g., balls to strikes), inning, runners on base (if any), score, expected run value, and the like.

In some embodiments, graph 200 may further include one or more global features, $u_{212}$. Global features, $u_{212}$, may include game context information for the current pitch. Generally, global features, $u_{212}$, may be similar to the node features, $v_i$, stored on each node. However, unlike node features, $v_i$, global features, $u_{212}$, may not include the outcome of each pitch and may only contain information pertaining to an upcoming pitch.

Figure 3:
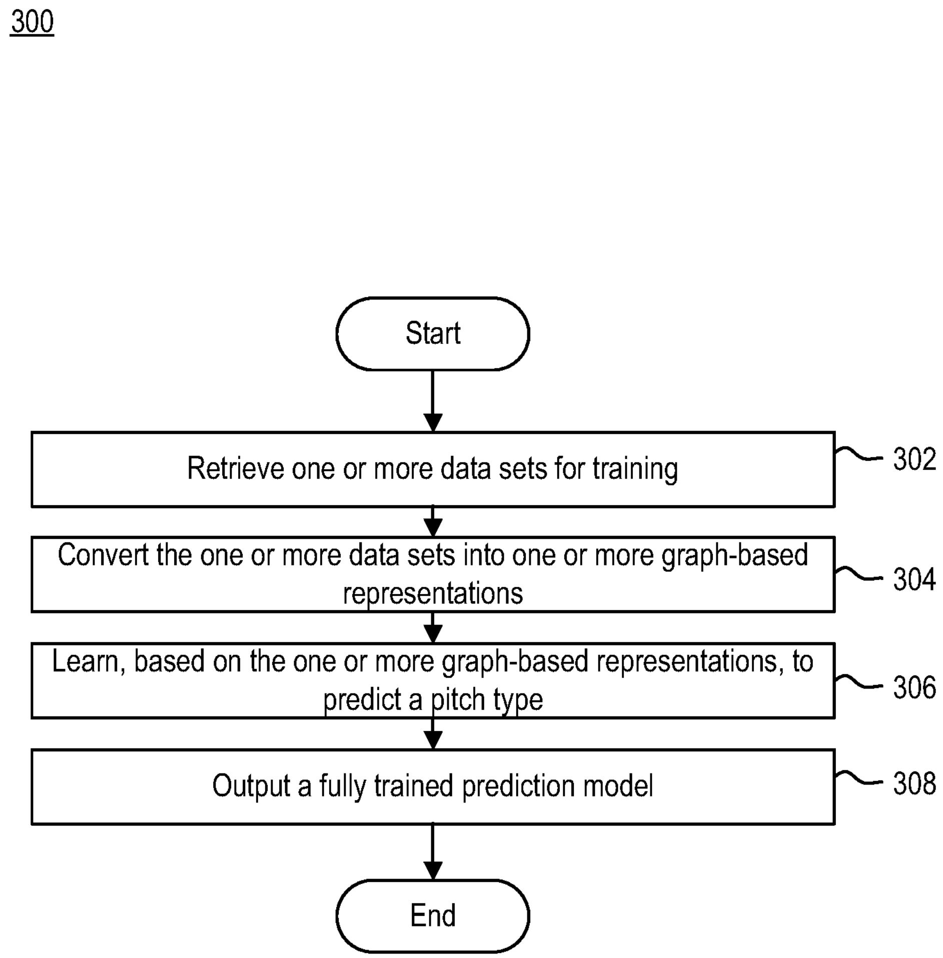
FIG. 3 is a flow diagram illustrating a method of generating a fully trained prediction model, according to example embodiments.

FIG. 3 is a flow diagram illustrating a method 300 of generating a prediction model, according to example embodiments. Method 300 may begin at step 302.

At step 302, organization computing system 104 may retrieve one or more data sets for training. For example, pre-processing agent 116 may retrieve one or more historical game files from data store 118. Each game file may include play-by-play information (e.g., pitch-by-pitch information). In some embodiments, each game file may further include game context information (e.g., current pitch count (e.g., balls and strikes) current inning, current score, runners on base, what happened at the pitch (e.g., hit, foul, out, strike, ball, etc.).

At step 304, organization computing system 104 may convert the one or more data sets into one or more graphs. For example, pre-processing agent 116 may generate a graph-based representation of the pitch-by-pitch data. For each game, pre-processing agent 116 may generate one or more graphs, with each graph corresponding to pitches delivered by a respective pitcher that game. In other words, each graph is dedicated to a specific outing for a specific pitcher. Each graph may include at least one node. Each node may correspond to a respective pitch delivered by the pitcher to the batter in the pitcher's appearance. Each node may include one or more node features. Exemplary node features may include, but are not limited to, the game context at each pitch, pitch outcomes, and various performance features associated with the batter and the pitcher. For example, node features may include pitch type, pitch points, pitch count (e.g., balls to strikes), inning, runners on base (if any), score, expected run value, and the like.

Each graph may further include an edge and global variables for each pitch. Each edge may represent the sequential ordering of pitches delivered by the pitcher. Generally, each edge may not include any information associated therewith. Instead, embeddings may be generated for each edge based on the two nodes associated with the edge. Each global feature may include game context information for a respective pitch. Generally, global features may be similar to the node features stored on each node. However, unlike node features, global features may only contain information pertaining to the upcoming pitch and may not include the outcome of each pitch.

At step 306, organization computing system 104 may learn, based on the one or more graphs, to predict a pitch type. For example, prediction engine 120 may learn, based on the one or more graphs, how to predict an upcoming pitch based on the historical pitch information and the game context. In some embodiments, prediction engine 120 may train graph neural network 122 to predict the next pitch based on previous pitches and the game context. As provided above, graph neural network 122 may include at least three multilayer perceptron layers 125*a*-125*c*. Prediction engine 120 may provide to multilayer perceptron layer 125*a*, as input, edge information that connects each pitch (e.g., each node) in time and features corresponding to the sending and receiving nodes of each edge. As output, multilayer perceptron layer 125*a* may generate new edge embeddings. Prediction engine 120 may provide to multilayer perceptron layer 125*b*, as input, each of the nodes corresponding to each pitch previously delivered by a specific pitcher in a game, as well as embedded values of the sending and receiving edges that are obtained from multilayer perceptron layer 125*a*. Prediction engine 120 may provide to multilayer perceptron layer 125*c*, as input, global variable information, which may incorporate the game context for the next pitch. In some embodiments, prediction engine 120 may further provide to multilayer perceptron layer 125*c* an aggregation of the embedded values of the edges and nodes obtained from multilayer perceptron layer 125*a* and 125*b*, respectively.

At step 308, organization computing system 104 may output a fully trained prediction model. For example, at the end of training and testing processes, prediction engine 120 may include a fully trained graph neural network 122.

Figure 4:
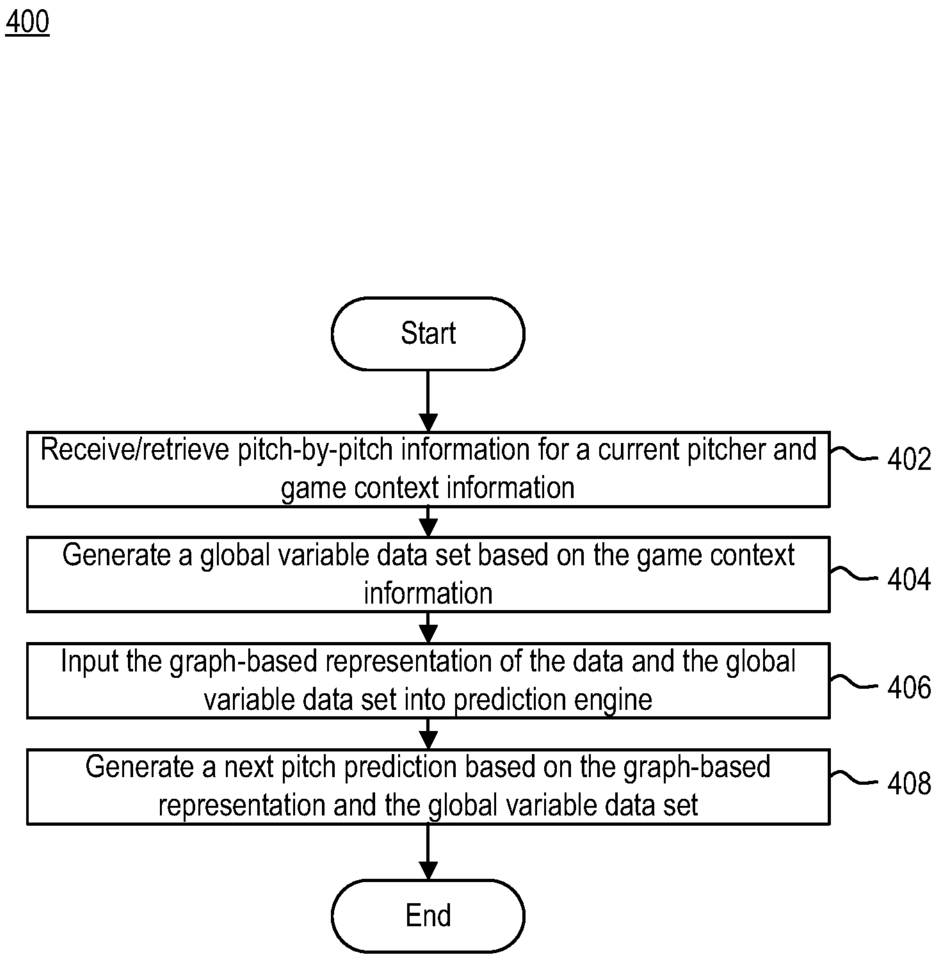
FIG. 4 is a flow diagram illustrating a method of predicting a next pitch, according to example embodiments.

FIG. 4 is a flow diagram illustrating a method 400 of predicting a next pitch, according to example embodiments. Method 400 may begin at step 402.

At step 402, organization computing system 104 may receive (or retrieve) pitch-by-pitch information for a current pitcher from a given event and current game context information. In some embodiments, the pitch-by-pitch data may include labels corresponding to a type of pitch from each pitch delivered by the pitcher up to the current pitch. For example, a pitch label may be one of the following pitch types: fastball (e.g., 4-seam fastball), change-up, breaking ball (e.g., slider, curve ball, knuckle curve, knuckle ball), and fast movement (e.g., 2-seam fastball, sinker, cutter, split finger). Game context information for each pitch may include, but is not limited to, current pitch count (e.g., balls and strikes) current inning, current score, runners on base, and the outcome of the pitch (e.g., hit, foul, out, strike, ball, etc.). In some embodiments, the pitch-by-pitch information may take the form of a graph-based representation of the data.

In some embodiments, the next pitch to be delivered by a respective pitcher may be the first pitch thrown by that pitcher in a given game. In such scenarios, prediction engine 120 may only receive information related to the current game context information and historical information related to the pitcher.

At step 404, organization computing system 104 may generate a global variable data set based on the game context information. For example, pre-processing agent 116 may include the current pitch count (e.g., balls to strikes), current inning, current runners on base (if any), current score, expected run value, and the like. In some embodiments, the global variable data set may be included in the graph-based representation of the pitch-by-pitch information and the game context information.

At step 406, organization computing system 104 may input the graph-based representation of the data and the global variable data set into prediction engine 120. For example, prediction engine 120 may selectively input in the graph-based representation of the data and the global variable data set into graph neural network 122. For example, prediction engine 120 may provide to multilayer perceptron layer 125*a*, as input, edge information that connects each pitch (e.g., each node) in time and features corresponding to the sending and receiving nodes of each edge. As output, multilayer perceptron layer 125*a* may generate new edge embeddings. Prediction engine 120 may provide to multilayer perceptron layer 125*b*, as input, each of the nodes corresponding to each pitch previously delivered by a specific pitcher in a game, as well as embedded values of the sending and receiving edges that are obtained from multilayer perceptron layer 125*a*. Prediction engine 120 may provide to multilayer perceptron layer 125*c*, as input, global variable information, which may incorporate the game context for the next pitch. In some embodiments, prediction engine 120 may further provide to multilayer perceptron layer 125*c* an aggregation of the embedded values of the edges and nodes obtained from multilayer perceptron layer 125*a* and 125*b*, respectively.

At step 408, organization computing system 104 may generate a prediction based on the inputted information. For example, prediction engine 120 may generate a predicted pitch type based on the graph-based representation of the data and the global variable data set. The prediction may include a selection of a pitch type. For example, prediction engine 120 may generate a pitch type for the upcoming pitch from the following pitch types: fastball (e.g., 4-seam fastball), change-up, breaking ball (e.g., slider, curve ball, knuckle curve, knuckle ball), and fast movement (e.g., 2-seam fastball, sinker, cutter, split finger). In some embodiments, the prediction may further include a speed and location of the pitch.

Figure 5:
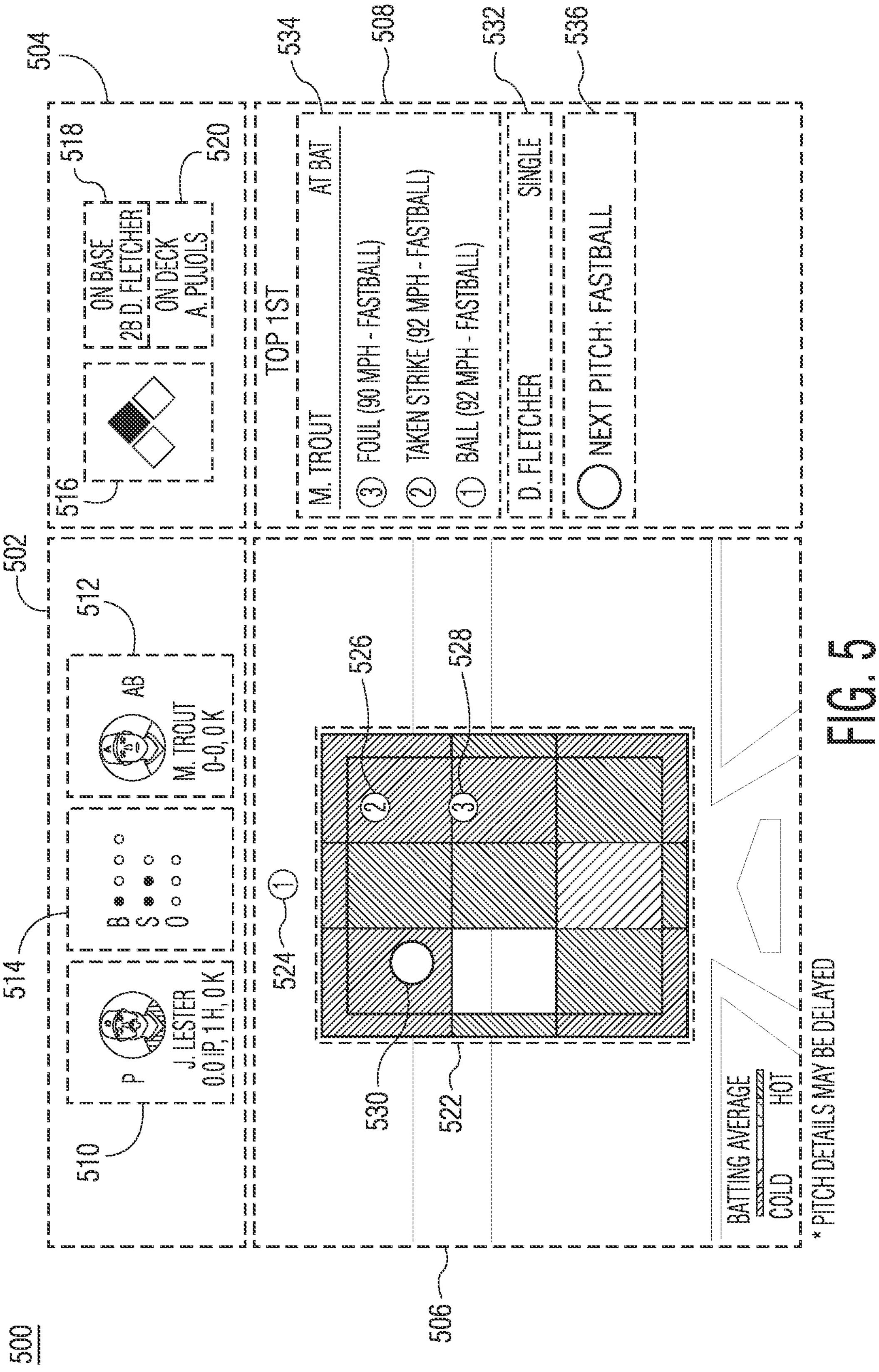
FIG. 5 illustrates an exemplary graphical user interface, according to example embodiments.

FIG. 5 illustrates an exemplary graphical user interface (GUI) 500 that includes a next pitch prediction, according to example embodiments. As shown, GUI 500 may include a first portion 502, a second portion 504, a third portion 506, and a fourth portion 508.

First portion 502 may include graphical representations of the current at-bat matchup. For example, first portion 502 may include a first graphical element 510 corresponding to the current pitcher, a second graphical element 512 corresponding to the current batter, and a third graphical element illustrating the pitch count and the number of outs. As illustrated, first graphical element 510 may correspond to Jon Lester; second graphical element 512 may correspond to Mike Trout; and third graphical element 514 may correspond to the current pitch count (one ball, two strikes, zero outs).

Second portion 504 may include graphical representation of the current game context. For example, second portion 504 may include a first graphical element 516 corresponding to the current players on-base, a second graphical element 518 corresponding to the name of the player on base (if any), and a third graphical element 520 corresponding to the player on-deck. As illustrated, first graphical element 516 may indicate that there is a player on second base; second graphical element 518 may indicate that the player on second based is David Fletcher (second baseman); third graphical element 520 may indicate that the player on-deck is Albert Pujols.

Third portion 506 may include a graphical representation of the strike zone. For example, third portion 506 may include graphical element 522. Graphical element 522 may illustrate the strike zone in baseball. In some embodiments, the strike zone may be color coded, indicating which portions of the strike zone are considered "hot" or "cold" to the batter. Further, graphical element 522 may further include one or more graphical elements 524-528. Each of graphical element 524-528 may correspond to a pitch that was delivered to the batter during the at-bat. As illustrated, graphical element 524 may correspond to a ball; graphical element 526 may correspond to a strike; and graphical element 528 may correspond to a foul ball.

In some embodiments, third portion 506 may include graphical element 530. Graphical element 530 may correspond to a predicted next pitch. For example, given the information associated with pitches 1-3, prediction engine 120 may be configured to predict the next pitch type (and location thereof).

Fourth portion 508 may include graphical element 532 and graphical element 534. Graphical element 532 may correspond to the previous at-bat (e.g., single by David Fletcher). Graphical element 534 may correspond to the current at-bat. For example, graphical element 534 may list the order of pitches delivered to the batter, the type of pitch, the speed of the pitch, and the result of the pitch.

In some embodiments, fourth portion 508 may further include graphical element 536. Graphical element 536 may correspond to graphical element 530. For example, graphical element 536 may include a written description of the predicted next pitch (e.g., type of pitch).

Figure 6A:
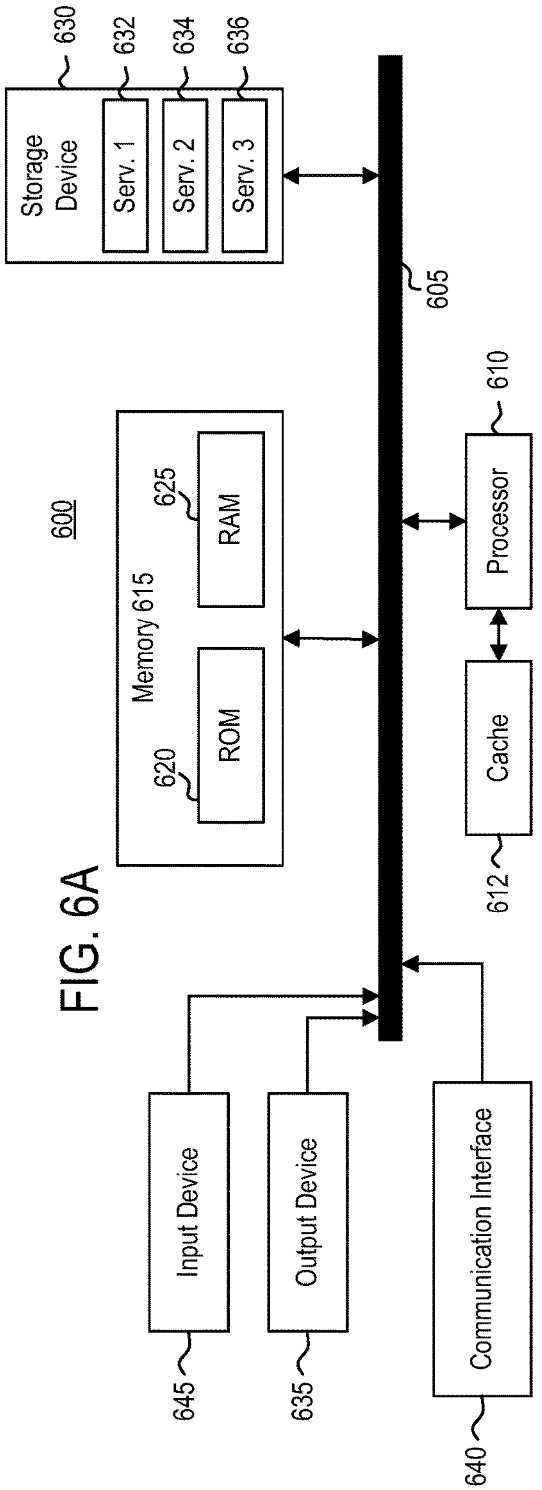
FIG. 6A is a block diagram illustrating a computing device, according to example embodiments.

FIG. 6A illustrates a system bus computing system architecture 600, according to example embodiments. System 600 may be representative of at least a portion of organization computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing device 600, an input device 645 may represent any number of input mechanisms, such as a microphone for speech, a touch-sensitive screen for gesture or graphical input, keyboard, mouse, motion input, speech and so forth. An output device 635 (e.g., a display) may also be one or more of a number of output mechanisms known to those of skill in the art. In some instances, multimodal systems may enable a user to provide multiple types of input to communicate with computing device 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

Figure 6B:
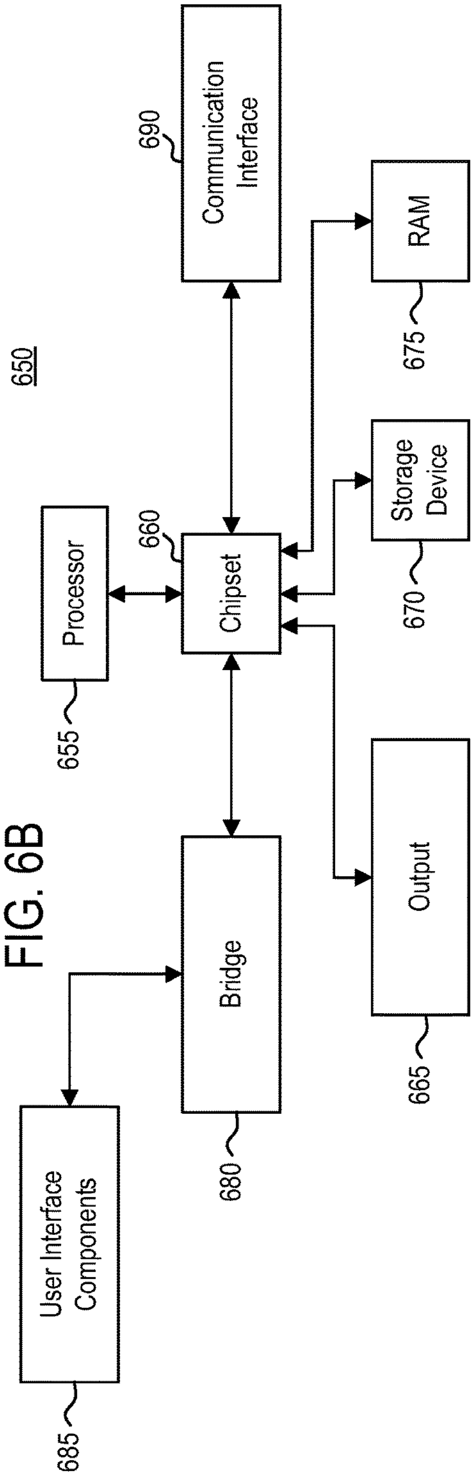
FIG. 6B is a block diagram illustrating a computing device, according to example embodiments.

FIG. 6B illustrates a computer system 650 having a chipset architecture that may represent at least a portion of organization computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid-state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or RAM 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for predicting a next pitch, comprising:

retrieving, by a computing system, pitch-by-pitch information for a plurality of events and game context information associated with each pitch in the pitch-by-pitch information;

converting, by the computing system, the pitch-by-pitch information and the game context information into a plurality of graph-based representations comprising nodes and edges;

providing, by the computing system, the plurality of graph-based representations to a graph neural network of the computing system;

training, by the computing system, the graph neural network to generate a pitch type prediction for each pitch based on the provided plurality of graph-based representations comprising the nodes and the edges, wherein the graph neural network includes a first multilayer perceptron layer, a second multilayer perceptron layer, and a third multilayer perceptron layer, and wherein the training comprises;

identifying a leading node and a trailing node for each of the edges;

outputting, from the first multilayer perceptron layer, embedded values of the edges based on (i) features corresponding to the leading node and the trailing node for each of the edges and (ii) edge information that connects each of the nodes in time;

outputting, from the second multilayer perceptron layer, embedded values of the nodes based on (i) the embedded values of the edges and (ii) each of the nodes corresponding to a respective pitch delivered by a respective pitcher in a game; and outputting, from the third multilayer perceptron layer, the pitch type prediction based on (i) the embedded values of the edges, (ii) the embedded values of the nodes, and (iii) global variable information incorporating the game context information;

providing, by the computing system, a current graph-based representation of current pitch-by-pitch information for a current pitcher and current game context information, to the trained graph neural network; and predicting, via the trained graph neural network, a pitch type for the next pitch to be delivered from the current pitcher based on the provided current graph-based representation of the current pitch-by-pitch information for the current pitcher and the current game context information.

2. The method of claim 1, wherein the pitch-by-pitch information comprises pitch type labels for each pitch in the pitch-by-pitch information.

3. The method of claim 1, wherein the game context information associated with each pitch in the pitch-by-pitch information comprises a pitch count, an inning, a score, runners on base, and result of the pitch.

4. The method of claim 1, wherein converting, by the computing system, the pitch-by-pitch information and the game context information into the plurality of graph-based representations comprising nodes and edges, comprises:

generating, for each pitcher in each event, a graph-based representation of pitches delivered, wherein each node in the graph-based representation corresponds to a respective pitch delivered by the respective pitcher and wherein each node comprises at least a type of pitch corresponding thereto.

5. The method of claim 4, further comprising:

connecting each node in the graph-based representation with an edge that denotes a sequential ordering of the pitches delivered.

6. The method of claim 5, further comprising:

generating a global variable data set for each node based on the pitch-by-pitch information and the game context information, wherein the global variable data set does not include a pitch type corresponding to the pitch associated with each node.

7. The method of claim 1, wherein outputting, from the third multilayer perceptron layer, the pitch type prediction is based on an aggregation of (i) the embedded values of the edges and (ii) the embedded values of the nodes.

8. A system for predicting a next pitch, comprising:

a processor; and a memory having programming instructions stored thereon, which, when executed by the processor, performs one or more operations, comprising:

retrieving pitch-by-pitch information for a plurality of events and game context information associated with each pitch in the pitch-by-pitch information;

converting the pitch-by-pitch information and the game context information into a plurality of graph-based representations comprising nodes and edges;

providing the plurality of graph-based representations to a graph neural network;

training the graph neural network to generate a pitch type prediction for each pitch based on the provided plurality of graph-based representations comprising the nodes and the edges, wherein the graph neural network includes a first multilayer perceptron layer, a second multilayer perceptron layer, and a third multilayer perceptron layer, and wherein the training comprises:

identifying a leading node and a trailing node for each of the edges;

outputting, from the first multilayer perceptron layer, embedded values of the edges based on (i) features corresponding to the leading node and the trailing node for each of the edges and (ii) edge information that connects each of the nodes in time;

outputting, from the second multilayer perceptron layer, embedded values of the nodes based on (i) the embedded values of the edges and (ii) each of the nodes corresponding to a respective pitch delivered by a respective pitcher in a game; and outputting, from the third multilayer perceptron layer, the pitch type prediction based on (i) the embedded values of the edges, (ii) the embedded values of the nodes, and (iii) global variable information incorporating the game context information;

providing a current graph-based representation of current pitch-by-pitch information for a current pitcher and current game context information, to the trained graph neural network; and predicting via the trained graph neural network, a pitch type for the next pitch to be delivered from the current pitcher, based on the provided current graph-based representation of the current pitch-by-pitch information for the current pitcher and the current game context information.

9. The system of claim 8, wherein the pitch-by-pitch information comprises pitch type labels for each pitch in the pitch-by-pitch information.

10. The system of claim 8, wherein the game context information associated with each pitch in the pitch-by-pitch information comprises a pitch count, an inning, a score, runners on base, and result of the pitch.

11. The system of claim 8, wherein converting the pitch-by-pitch information and the game context information into the plurality of graph-based representations comprising nodes and edges, comprises:

generating, for each pitcher in each event, a graph-based representation of pitches delivered, wherein each node in the graph-based representation corresponds to a respective pitch delivered by the respective pitcher and wherein each node comprises at least a type of pitch corresponding thereto.

12. The system of claim 11, further comprising:

connecting each node in the graph-based representation with an edge that denotes a sequential ordering of the pitches delivered.

13. The system of claim 12, further comprising:

generating a global variable data set based on the game context information, wherein the global variable data set does not include a pitch type corresponding to the pitch.

14. The system of claim 8, wherein outputting, from the third multilayer perceptron layer, the pitch type prediction is based on an aggregation of (i) the embedded values of the edges and (ii) the embedded values of the nodes.

15. A non-transitory computer readable medium including one or more sequences of instructions that, when executed by one or more processors, causes:

retrieving, by a computing system, pitch-by-pitch information for a plurality of events and game context information associated with each pitch in the pitch-by-pitch information;

converting, by the computing system, the pitch-by-pitch information and the game context information into a plurality of graph-based representations comprising nodes and edges;

providing, by the computing system, the plurality of graph-based representations to a graph neural network of the computing system;

training, by the computing system, the graph neural network to generate a pitch type prediction for each pitch based on the provided plurality of graph-based representations comprising the nodes and the edges, wherein the graph neural network includes a first multilayer perceptron layer, a second multilayer perceptron layer, and a third multilayer perceptron layer, and wherein the training comprises:

identifying a leading node and a trailing node for each of the edges;

outputting, from the first multilayer perceptron layer, embedded values of the edges based on (i) features corresponding to the leading node and the trailing node for each of the edges and (ii) edge information that connects each of the nodes in time;

outputting, from the second multilayer perceptron layer, embedded values of the nodes based on (i) the embedded values of the edges and (ii) each of the nodes corresponding to a respective pitch delivered by a respective pitcher in a game; and outputting, from the third multilayer perceptron layer, the pitch type prediction based on (i) the embedded values of the edges, (ii) the embedded values of the nodes, and (iii) global variable information incorporating the game context information;

providing, by the computing system, a current graph-based representation of current pitch-by-pitch information for a current pitcher and current game context information, to the trained graph neural network; and predicting, via the trained graph neural network, a pitch type for a next pitch to be delivered from the current pitcher, based on the provided current graph-based representation of the current pitch-by-pitch information for the current pitcher and the current game context information.

16. The non-transitory computer readable medium of claim 15, wherein the pitch-by-pitch information comprises pitch type labels for each pitch in the pitch-by-pitch information.

17. The non-transitory computer readable medium of claim 15, wherein the game context information associated with each pitch in the pitch-by-pitch information comprises a pitch count, an inning, a score, runners on base, and result of the pitch.

18. The non-transitory computer readable medium of claim 15, wherein converting, by the computing system, the pitch-by-pitch information and the game context information into the plurality of graph-based representations comprising nodes and edges, comprises:

generating, for each pitcher in each event, a graph-based representation of pitches delivered, wherein each node in the graph-based representation corresponds to a respective pitch delivered by the respective pitcher and wherein each node comprises at least a type of pitch corresponding thereto.

19. The non-transitory computer readable medium of claim 18, wherein execution of the one or more sequences of instructions further causes:

connecting each node in the graph-based representation with an edge that denotes a sequential ordering of the pitches delivered.

20. The non-transitory computer readable medium of claim 19, wherein execution of the one or more sequences of instructions further causes:

generating a global variable data set for the game context information for the pitch, wherein the global variable data set does not include a pitch type corresponding to the pitch.

* * * * *